(12) United States Patent
Sandner et al.

(10) Patent No.: US 7,660,364 B2
(45) Date of Patent: Feb. 9, 2010

(54) METHOD OF TRANSMITTING SERIAL BIT-STREAM AND ELECTRONIC TRANSMITTER FOR TRANSMITTING A SERIAL BIT-STREAM

(75) Inventors: Harald Sandner, Marzling (DE); Joerg Goller, Zweikirchen (DE)

(73) Assignee: Texas Instruments Deutschland GmbH, Freising (DE)

( * ) Notice: Subject to any disclaimer, the term of this patent is extended or adjusted under 35 U.S.C. 154(b) by 571 days.

(21) Appl. No.: 11/384,731

(22) Filed: Mar. 20, 2006

(65) Prior Publication Data

US 2007/0069927 A1 Mar. 29, 2007

(30) Foreign Application Priority Data

Mar. 23, 2005 (DE) .................. 10 2005 013 480

(51) Int. Cl.
*H04L 27/00* (2006.01)
(52) U.S. Cl. ........................ 375/295; 327/233
(58) Field of Classification Search ............. 375/295; 327/233; 326/93
See application file for complete search history.

(56) References Cited

U.S. PATENT DOCUMENTS 5,854,765 A * 12/1998 Shinozaki .................. 365/201
6,545,507 B1 * 4/2003 Goller ......................... 326/93
6,768,728 B1 * 7/2004 Kim et al. .................. 370/342
2004/0257137 A1 * 12/2004 Chang ........................ 327/233
2005/0069064 A1 * 3/2005 Propp et al. ................. 375/350

FOREIGN PATENT DOCUMENTS

JP 57089360 A * 6/1982

OTHER PUBLICATIONS

English Abstract of JP 57089360.*
English Abstract of JP-57089360, published Jun. 3, 1982, NEC corporation.*

* cited by examiner

*Primary Examiner*—David C Payne
*Assistant Examiner*—Tanmay K Shah
(74) *Attorney, Agent, or Firm*—John J. Patti; Wade J. Brady, III; Frederick J. Telecky, Jr.

(57) ABSTRACT

The present invention relates to an electronic transmitter for serially transmitting bit sequences. The electronic transmitter includes a detection device 10 and a transmitting device 12. The detection device 10 is adapted to detect a predefined bit sequence for transmittal. The predefined bit sequence is susceptible to inter-symbol-interference. The transmitting device 12 is adapted to transmit serially the detected predefined bit sequence in such a way, that a duration for transmittal of a particular bit in said predefined bit sequence is longer than a duration of transmittal of remaining bits in said predefined bit sequence.

6 Claims, 3 Drawing Sheets

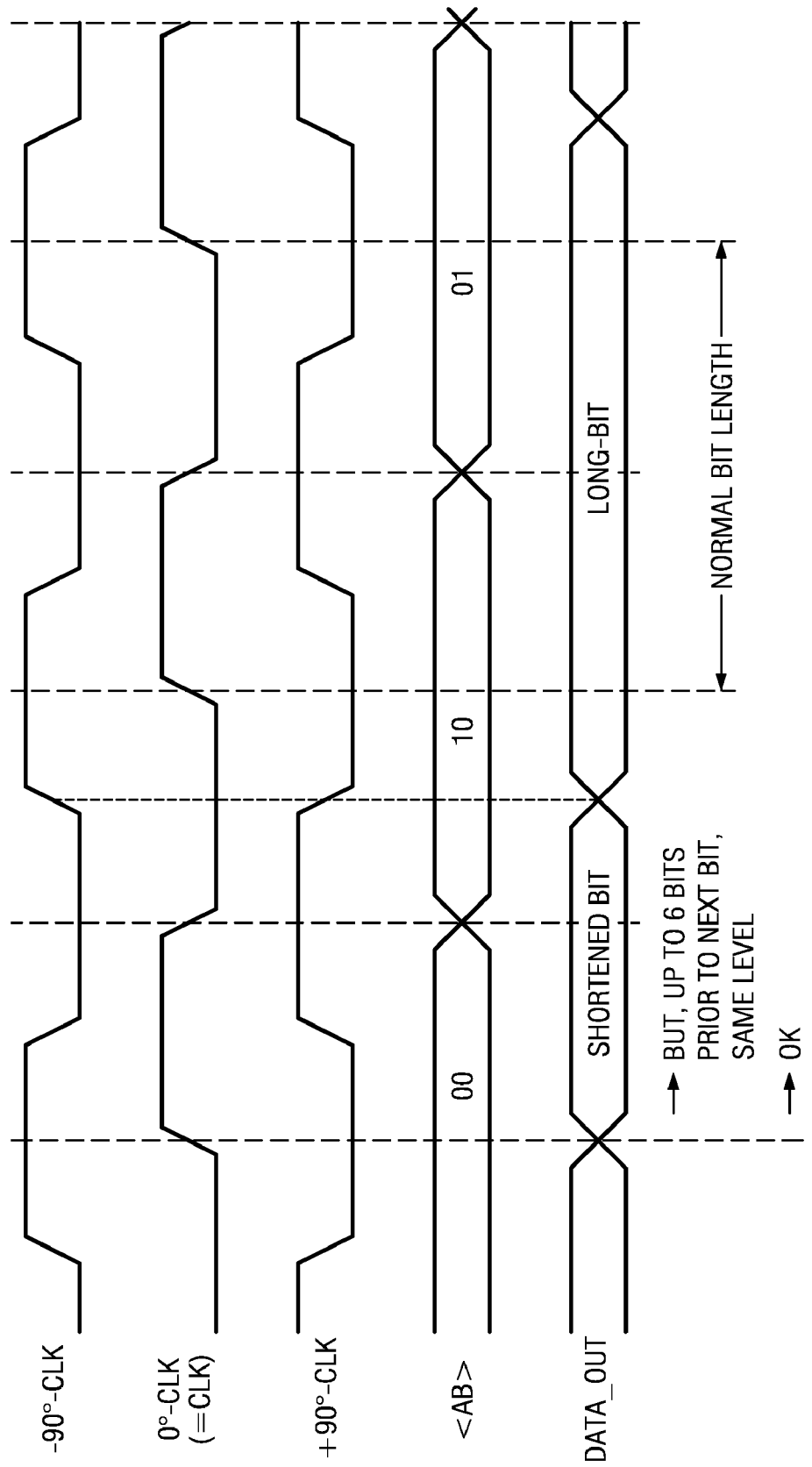

METHOD OF TRANSMITTING SERIAL BIT-STREAM AND ELECTRONIC TRANSMITTER FOR TRANSMITTING A SERIAL BIT-STREAM

CROSS-REFERENCE TO RELATED APPLICATIONS

This application claims priority under 35 USC § 119 of German Application Serial No. 10 2005 013480.7, filed Mar. 23, 2005.

FIELD OF THE INVENTION

The present invention relates to a method of transmitting a serial bit-stream and to an electronic transmitter for transmitting a serial bit-stream.

BACKGROUND OF THE INVENTION

Conventionally, a transmission system comprises an electronic transmitter, a transmission channel and an electronic receiver. The transmission channel may consist of any medium used for data transfer. In particular, physical lines are used. But a wireless channel is also conceivable, wherein data transfer is accomplished through electromagnetic radiation.

The electronic transmitter usually comprises a clock generator as well as a transmitting unit. Information is encoded bitwise and each bit is synchronized with the transmitter clock. In particular, the transmitter may output a relatively high voltage representative of a bit 1 and a relatively low voltage representative of a bit 0 on a transmission line. Transitions from a high to a low voltage and vice versa are both synchronized with respective up transitions of the clock signal. The high bit voltage as well as the low bit voltage are transferred during a period of the clock, in order to transmit a single bit.

The transferred signal is recovered by the receiver. The receiver comprises a clock and a receiving unit. In particular, the clock is recovered from the transferred data using a phase locked loop. The transferred bits are sampled in synchronism with the clock. The ideal sampling point for bit recovery lies halfway between two consecutive edges of the recovered clock. Therefore, the sampling points are phase shifted by T/2 in relation to the clock transitions.

Due to the attenuation and delay characteristics of the transmission channel, jitter occurs on this side of the receiver. Jitter stands for the deviation of an event from the ideal timing of the event. In the instance of a data communication system, the event recorded is the transition of the received data signal. The ideal timing of this event is in synchronism with the clock transitions provided by the recovered clock. However, as a result of jitter the received data transitions do not occur simultaneously with the clock transitions.

The problem of jitter has been addressed in the state of the art concerned with data transmission. In particular, a certain kind of data dependent jitter, namely inter-symbol-interference (ISI) has been recognized. The X-axis of the coordinate system shown in FIG. 1 represents time and the Y-axis the voltage of the received signals. Signal 1 represents the received wave form, which is detected, if a bit pattern 11110 is transmitted. Signal 2 results from a bit pattern 00010. The initial voltage value of signal 1 represents a high voltage state corresponding to a high bit, whereas an initial state of signal 2 is the opposite, namely a low voltage state representative of a low bit. A horizontal line between the two initial states of signals 1 and 3 represents the intermediate voltage in the center between the initial state of the first and second signal. Signal 1 eventually descends down to the low voltage state, whereby it intersects the intermediate state. Signal 2 rises above the intermediate state, but does not reach the high voltage binary state. Instead, signal 2 descends down to its initial state, before reaching the high voltage state. Because of the attenuation and the delay of the transmission channel, both signals 1 and 2 do not intersect the intermediate state during a top down transition at the same point in time. The inter-symbol-interference time skew $T_{ISI}$ is representative of the jitter caused by inter-symbol-interference. The reason for inter-symbol-interference is that signal 2 does not reach the voltage level, from which signal 1 descends. The effect of inter-symbol-interference is an increased bit error ratio (BER) on the side of the receiver.

A state of the art solution to the problem of inter-symbol-interference in data transmission systems consists of providing four different voltage levels for transmitting signals on the side of the transmitter. The two intermediate voltage levels of the four voltage levels correspond to the up and down voltage states conventionally used. A further higher and lower voltage state is also provided for transmission. Each time a transition from a low to a high bit is to be transferred, the transmitter chooses a voltage level having an increased amplitude for transmitting said bit sequence transition. Signal 3 in FIG. 1 shows the resulting waveform for the bit pattern 00010 (bit pattern of signal 2). Since the high bit is transferred with an added voltage amplitude, the received waveform rises to a far higher level than signal 2. Consequently, the intersection between the falling edge of signal 3 and the intermediate level shown in FIG. 1 is almost synchronous with the intersection between the signal 1 and the intermediate level. The inter-symbol-interference skew has been improved. However, the pre-emphasis of the voltage amplitude leads to increased power consumption on the side of the transmitter. Furthermore, additional jitter may occur if pre-emphasis over compensates the attenuation on the transmission line or if the pre-emphasis compensation is insufficient.

SUMMARY OF THE INVENTION

The present invention provides a method of serially transmitting bit sequences using an electronic transmitter for serially transmitting bit sequences, which compensate for inter-symbol-interference without the need for increased power and without introducing additional jitter.

The method of transmitting a serial bit-stream according to a preferred embodiment of the present invention comprises the steps of buffering the bit-stream prior to its transmission and detecting a predefined bit sequences. The predefined bit sequences is susceptible to inter-symbol-interference. The method according to a preferred embodiment of the present invention further comprises the steps of feeding the buffered bit stream to a clocked transmitter and adjusting the phase of a clock applied to the clocked transmitter, so that a duration for transmittal of a particular bit in a detected predefined bit sequence is longer than a duration of transmittal of remaining bits in said detected predefined bit sequence.

A preferred embodiment of the present invention also relates to an electronic transmitter for serially transmitting bit sequences. The electronic transmitter according to the invention comprises a detection device adapted to detect a predefined bit sequence for transmittal. In particular, bit sequences may be detected, which lead to inter-symbol-interference with a high probability. The electronic transmitter according to the invention further comprises a transmitting device adapted to transmit serially the detected predefined bit sequence. The transmission of the bit sequence is carried out in such a way that a duration of transmittal of a particular bit in the bit sequence is longer than a duration of transmittal of remaining bits in the bit sequence. Instead of increasing the voltage amplitude as done in the state of the art, the effect of inter-symbol-interference is alleviated by prolonging the duration, during which a particular bit prone to inter-symbol-interference is transmitted.

Since the transmission time is longer, there is more time for the received signal to reach its full amplitude. Consequently, signal 2 in FIG. 1 may rise up to the initial level of signal 1 in FIG. 1. The inter-symbol-interference jitter is considerably reduced. Furthermore, the energy consumption is lower, because additional voltage levels for transmission must not be used. The bit error ratio is reduced. The recovery of the clock at the receiver is facilitated. The reliability of data transmission is enhanced. Longer transmission lines may be used for data transmission. Cheaper connectors and cables may be used without impeding data transmission.

Preferably, the detector of the electronic transmitter is adapted to detect a particular bit sequence. This bit sequence comprises a plurality of bits in a first state (up or down) followed by a single bit in a second state (down or up). The single bit in the second state is followed by a further bit in the first state. Inter-symbol-interference is likely to occur on the side of the receiver when detecting the single bit in the second state. The detector of the electronic transmitter is capable of detecting bit sequences causing inter-symbol-interference. In order to alleviate the effect of inter-symbol-interference, the transmitting device is adapted to prolong the duration of transmittal of the bit in the second state. Hence, the single bit has a longer time to rise to its maximum value on the side of the receiver. The attenuation of the transmission channel is compensated.

Preferably, the detector comprises a buffering unit and a monitoring unit. The buffering unit is adapted to receive the serial bit-stream. It continuously buffers a predefined number of said bits for transmittal. The number of buffered bits corresponds to the number of bits in the predefined bit sequence that is to be detected. Preferably, the buffering unit is a shift register, which shifts the bits through its stages. The monitoring unit is adapted to continuously monitor, whether the stored predefined number of bits in the buffering unit corresponds to the predefined bit sequence prone to inter-symbol-interference. To this end, the monitoring unit comprises a decision logic adapted to read out in parallel the bits from the shift register. In this way, the bits received by the transmitter for transmission may be monitored without impeding the flow of bits to the transmitter.

The transmitting device preferably comprises a clock generator, a phase multiplexer and a transmitting unit. The clock generator is adapted to generate a predefined number of clock signals. Each of said clock signals has the same frequency. The clock signals are phase-shifted in relation to each other. The phase multiplexer is adapted to select one of said clock signals and output the selected clock signal to the transmitting unit. The bit length of the selected clock signal is changed by the multiplexer, i.e. the distance between neighboring rising and/or falling edges is adjusted. The transmitting unit is adapted to receive the selected clock signal. The selected clock signal triggers the transmission of bits by the transmitting unit. In particular, a rising edge of the clock signal may trigger the transmission of a single bit. The transmission of the single bit may be terminated by the next rising edge of the clock signal. Since the distance in time between the rising edges may be adjusted by the phase multiplexer, the transmission duration of the single bit may be adjusted appropriately. Thereby, inter-symbol-interference effects may be alleviated. Preferably, the phase multiplexer receives a signal from the detector, indicating that a particular bit sequence prone to inter-symbol-interference has been detected in order to set up the multiplexer for manipulation of the clock phase. The clock generator may be a phase locked loop having a ring oscillator, which provides several clock signals having a predefined phase relationship. The transmitting unit may provide voltage signals or generate electromagnetic radiation. The transmission channel, across which the signals are sent, may be a transmission line or a wireless channel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 shows graphs of clock signals on lines generated by a clock signal generator of FIG. 1 as well as a graph of the signal input to the multiplexer in FIG. 3 and output signals from a transmitting unit in FIG. 3.

DETAILED DESCRIPTION OF THE DRAWINGS

Figure 1:
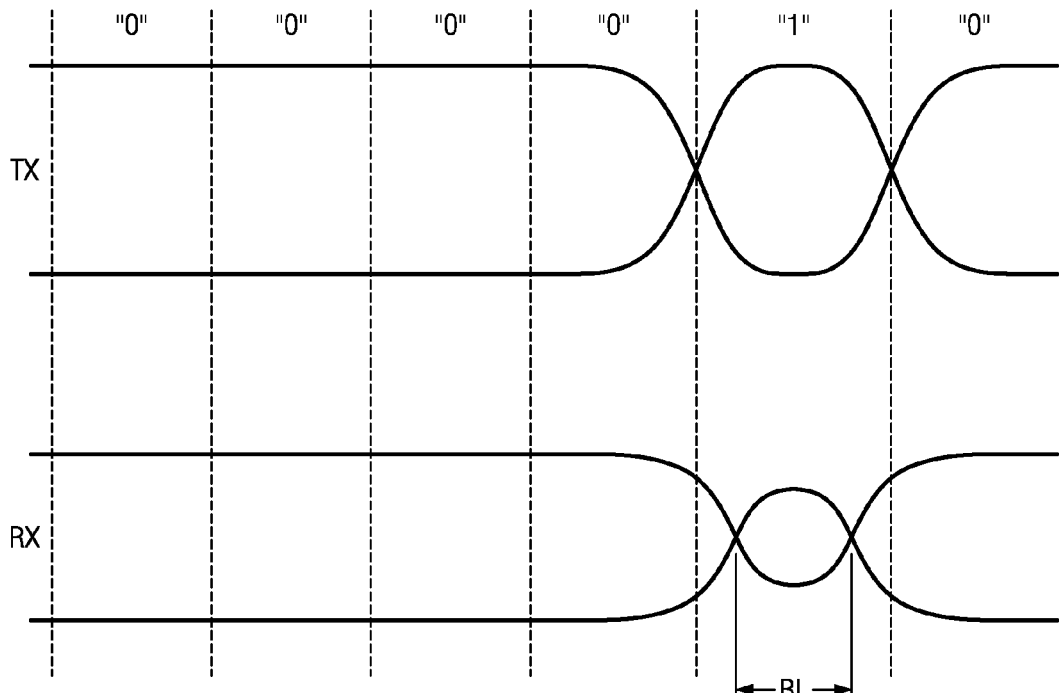
FIG. 1 shows a graph indicating a waveform of received signals that result from different bit patterns.

Refer now to the drawings wherein depicted elements are, for the sake of clarity, not necessarily shown to scale and wherein like or similar elements are designated by the same reference numeral through the several views.

Figure 2:
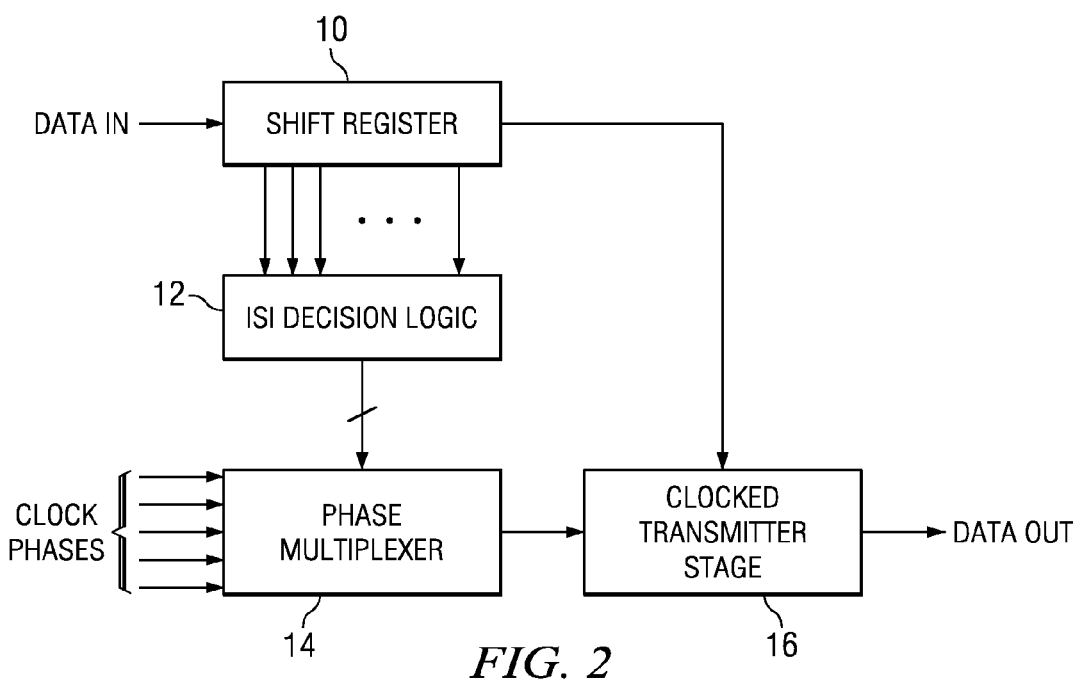
FIG. 2 shows a first embodiment of the electronic transmitter for seriously transmitting bit sequences in accordance with a preferred embodiment of the present invention.

The electronic transmitter according to FIG. 2 comprises a shift register 10 which acts as a buffer memory and has an input DATA IN which receives a serial bit-stream. Shift register 10 has a number of stages appropriate for buffering a sequence of consecutive bits susceptible to produce inter-symbol interference, as explained at the outset with reference to FIG. 1. Each stage of shift register 10 has an output connected to a corresponding input of decision logic circuitry 12, which is adapted to detect in the buffered bit sequence specific patterns susceptible of producing inter-symbol interference (ISI). Decision logic circuitry 12 has a parallel output connected to a corresponding control input of a phase multiplexer 14. Phase multiplexer 14 has a plurality of clock signal inputs for clock signals received from a clock generator (reference numeral 18 of FIG. 3). These clock signals are all of a like clock frequency and have a mutual phase-shift of like amount. A typical clock generator would be made-up by a phase locked loop with a voltage 5 controlled ring oscillator each stage of which, e.g., five stages, would provide one of the mutually-phase shifted clock signals. Shift register 10 would also receive a clock signal from the clock generator. A clocked transmitter stage 16 has a signal input connected to a signal output of shift register 10 and a clock input connected to the output of phase multiplexer 14. The output Data Out of clocked transmitter stage 16 drives a transmission channel which may use any of the available technologies and standards.

The ICI decision logic, circuitry 12, determines out of the plurality of clock signals applied to phase multiplexer 14 the one that provides the best compensation for ISI distortion, in presence of each particular bit sequence sensed at the stage outputs of shift register 10. Accordingly, the duration of certain bits in the bit-stream at the output Data Out of the clocked transmitter stage 16 will be increased or decreased with respect to the normal duration of other bits in the bit-stream.

Figure 3:
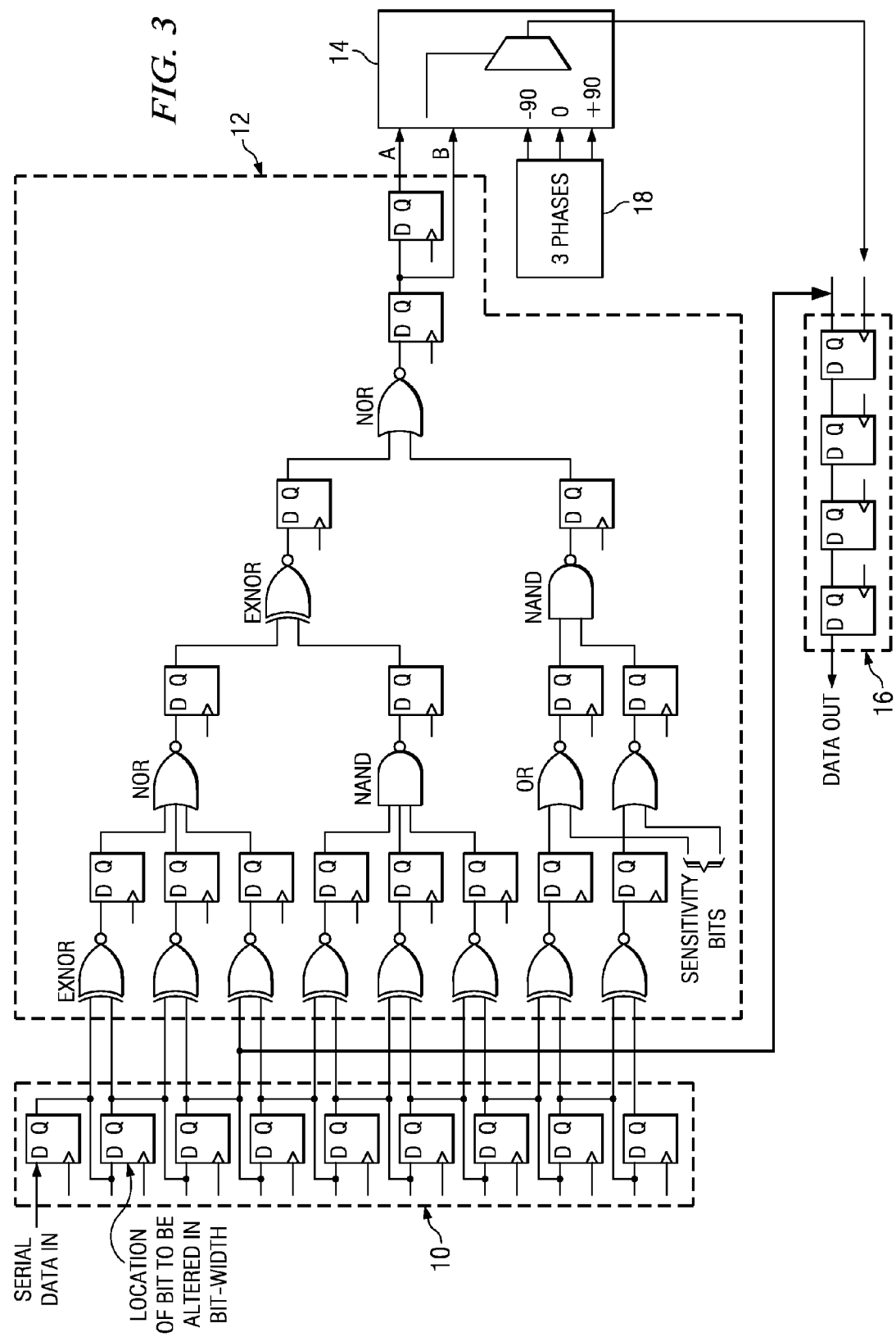
FIG. 3 shows an electronic transmitter according to a preferred embodiment of the present invention.

In FIG. 3, shift register 10 is formed by nine cascaded D-flip-flops. The ISI decision logic 12 has a first level formed of eight exclusive-nor gates XNOR each of which has two inputs connected to the outputs of two successive D-flip-flops of shift register 10, and of eight D-flip-flops each associated with one of the exclusive-NOR gates XNOR and receiving its output on the data input. On a second level, logic 12 has a NOR gate, a NAND gate and two OR gates that combine the 25 outputs of the first to third, fourth to sixth, seventh and eighth D-flip-flop, respectively, of the preceding level. The outputs of the NOR gate, the NAND gate and the OR gates are buffered by associated D-flip-flops. On a third level of logic 12, the outputs of the preceding D-flip-flops are combined by an exclusive-NOR gate XNOR and by a NAND gate, the outputs of which are each buffered by an associated D-flip-flop. On a fourth level, the outputs of the preceding D-flip-flops are combined by a NOR gate, followed by two cascaded D-flip-flops. The outputs A and B of these D-flip-flops are control inputs to phase multiplexer 14.

All D-flip-flops in shift register 10 and in logic 12 are clocked with the same clock signal, i.e., clock signal "0" out of the three clock signals "−90", "0", and "+90" applied to phase multiplexer 14. In this example, simplified for purposes of explanation, only three clock signals of like frequency and with a phase shifts of +90° or −90° are considered. The output of phase multiplexer 14 is connected to the clock input of clocked transmitter stage 16. Transmitter stage 16 includes a shift register of four cascaded D-flip-flops that are all clocked by the clock at the output of multiplexer 14. The number of stages in the shift register of course corresponds to the number of cascaded flip-flops in logic 12. In FIG. 3, the data input to clocked transmitter stage 16 is taken from the output of the third D-flip-flop in shift register 10. It should be clear that the appropriate stage in the shift register for deriving the input to transmitter stage 16 is determined by the overall timing. With the configuration shown, from the $5^{th}$ clock after detection of action required, bits get changed. The last bit of a long sequence gets shortened (−90°) and a subsequent bit gets lengthened (+90°).

The sensitivity of ISI detection is determined by the depth of shift register 10, i.e. the number of its stages. In the embodiment shown, the sensitivity may be increased or decreased by activating or deactivating the 8th and 9th stages of shift register 10. This is achieved by selectively applying a logic low or high level to one of the two inputs of the OR gates on the second level of logic 12.

In the chart of FIG. 4, the upper signals "−90°-CLK", "0°-CLK" and "+90°-CLK" are the three clock signals applied to the signal inputs of phase multiplexer 14. Signal "<AB>" is the combination of control signals A and B applied to the control inputs of phase multiplexer 14. "DATA OUT" is the resulting serial bit stream at the output of transmitter stage 16. When both signals A and B are at logic low ("00"), phase multiplexer 14 outputs the "0°-CLK" clock signal. When signal A is at logic high and signal B is at logic low ("10"), phase multiplexer 14 outputs the "−90°-CLK" clock signal, and the duration of a transmitted bit is shortened. When signal A is at logic low and signal B is at logic high ("01"), phase multiplexer 14 outputs the "+90°-CLK" clock signal, and the duration of a transmitted bit is lengthened.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a buffer memory having a plurality of stages, wherein the buffer memory receives serial data;
   decision logic that detects whether at least one of a plurality of predetermined bit sequences is present in the serial data, and wherein each of the plurality of predetermined bit sequences is susceptible to inter-symbol-interference (ISI), and wherein the decision logic includes:
      a plurality of XNOR gates, wherein each XNOR gate is coupled to at least two successive stages of the buffer memory;
      a first set of D-flip-flops, wherein each D-flip-flop from the first set of D-flip-flops is coupled to at least one of the XNOR gates;
      a first set of logic gates, wherein each logic gate from the first set of logic gates is coupled to a plurality of D-flip-flops from the first set of D-flip-flops;
      a second set of D-flip-flops, wherein each D-flip-flop from the second set of D-flip-flops is coupled at least one of the logic gates from the first set of logic gates; and
      a second set of logic gates, wherein each logic gate from the second set of logic gates is coupled to a plurality of D-flip-flops from the second set of D-flip-flops;
   a transmitter that is coupled to the buffer memory so as to receive the serial data from the buffer memory;
   a clock generate having a plurality of output terminals, wherein each output terminal outputs at least one phase of a clock signal;
   a phase multiplexer having a plurality of selection terminals, a plurality of input terminals, and an output terminal, wherein each selection terminal is coupled to the decision logic, and wherein each input terminal of the phase multiplexer is coupled to at least one of the output terminals of the clock generator, and wherein the output terminal of the phase multiplexer is coupled to each of the buffer memory and the transmitter, and wherein each D-flip-flop from the first set of D-flip-flops is coupled to the output terminal of the phase multiplexer.

2. The apparatus of claim 1, wherein the buffer memory further comprises a shift register having a plurality of D-flip-flips that are coupled in series with one another and that are each coupled to the output terminal of the phase multiplexer.

3. The apparatus of claim 1, wherein the transmitter further comprises a shifter register having a plurality of D-flip-flops that are coupled to one another in series and that are coupled to the output terminal of the phase multiplexer.

4. An apparatus comprising:
a first shift register including a plurality of D-flip-flops that are coupled in series with one another;
decision logic including:
a plurality of first XNOR gates, wherein each is coupled to at least two successive D-flip-flops from the first shift register;
a first set of D-flip-flops, wherein each D-flip-flop from the first set of D-flip-flops is coupled to at least one of the first XNOR gates;
a first NOR gate that is coupled to a plurality D-flip-flops from the first set of D-flip-flops;
a first NAND gate that is coupled to a plurality D-flip-flops from the first set of D-flip-flops;
a second NOR gate that is coupled to at least one D-flip-flop from the first set of D-flip-flops;
a third NOR gate that is coupled to at least one D-flip-flop from the first set of D-flip-flops;
a second set of D-flip-flops, wherein each D-flip-flop from the second set of D-flip-flops is coupled at least one of the first NOR gate, the second NOR gate, the third NOR gate, and the first NAND gate;
a second XNOR gate that is coupled to a plurality of D-flip-flops from the second set of D-flip-flops;
a second NAND gate that is coupled to a plurality of D-flip-flops from the second set of D-flip-flops;
a third set of D-flip-flops, wherein each D-flip-flop from the third set of D-flip-flops is coupled to at least one of the second XNOR gate and the second NAND gate;
a fourth NOR gate that is coupled to each D-flip-flop from the third set of D-flip-flops;
a first downstream D-flip-flop that is coupled to the fourth NOR gate; and
a second downstream D-flip-flop that is coupled to the first downstream flip-flop;
a second shift register having a plurality of D-flip-flops that are coupled in series with one another, wherein the first D-flip-flop of the second shift register is coupled to the first shift register;
a clock generate having a plurality of output terminals, wherein each output terminal outputs at least one phase of a clock signal;
a phase multiplexer having a first selection terminal, a second selection terminal, a plurality of input terminals, and an output terminal, wherein the first selection terminal is coupled to the second downstream D-flip-flop from the decision logic, and wherein the second selection terminal is coupled to the first downstream D-flip-flop from the decision logic, and wherein each input terminal of the phase multiplexer is coupled to at least one of the output terminals of the clock generator, and wherein the output terminal of the phase multiplexer is coupled to each of D-flip-flop from the first shift register, the decision logic, and the second shift register.

5. The apparatus of claim 4, wherein the first shift register includes 9 D-flip-flops.

6. The apparatus of claim 5, wherein the second shift register includes 4 D-flip-flops, and wherein the first D-flip-flop of the second shift register is coupled to the third D-flip-flop from the first shift register.

* * * * *

UNITED STATES PATENT AND TRADEMARK OFFICE
CERTIFICATE OF CORRECTION

| | |
|---|---|
| PATENT NO. | : 7,660,364 B2 |
| APPLICATION NO. | : 11/384731 |
| DATED | : February 9, 2010 |
| INVENTOR(S) | : Sandner et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Twenty-eighth Day of December, 2010

David J. Kappos
*Director of the United States Patent and Trademark Office*